United States Patent [19]
Giovanni

[11] 3,964,705
[45] June 22, 1976

[54] FRAME FOR THE MOUNTING OF INTERCHANGEABLE ELECTRICAL UNITS

[75] Inventor: Zago Giovanni, Milan, Italy

[73] Assignee: Bassani S.p.A., Milan, Italy

[22] Filed: Oct. 24, 1974

[21] Appl. No.: 517,830

Related U.S. Application Data

[63] Continuation-in-part of Ser. No. 210,663, Dec. 22, 1971, abandoned.

[30] Foreign Application Priority Data

Dec. 23, 1970 Italy .................................. 23782/70

[52] U.S. Cl. ............................... 248/27 R; 174/53; 248/500
[51] Int. Cl.² ....................... A47F 5/08; A47F 7/00; H01R 9/00
[58] Field of Search ......... 248/27; 339/17 C, 17 CF, 339/126 R, 198 GA; 174/53

[56] References Cited
UNITED STATES PATENTS

| | | | |
|---|---|---|---|
| 3,191,135 | 6/1965 | Hazelquist | 248/27 X |
| 3,215,380 | 11/1965 | Morris et al. | 248/27 |
| 3,335,248 | 8/1967 | Bassani | 174/53 X |
| 3,412,368 | 11/1968 | Asbridge et al. | 339/126 R |
| 3,547,274 | 12/1970 | Sosinkski | 211/89 |
| 3,576,520 | 4/1971 | Stauffer | 339/198 G |
| 3,793,563 | 2/1974 | Brefka | 248/27 |

Primary Examiner—J. Franklin Foss
Attorney, Agent, or Firm—Michael J. Striker

[57] ABSTRACT

A novel article of manufacture for mounting interchangeable electrical units having oppositely directed projections is disclosed. The article consisting of a one-piece mounting frame formed of insulating synthetic plastic material has a row of openings extending between front and rear surfaces into each of which a unit may be inserted until arrested by an abutment provided in each opening. A frame stiffening member having recesses to receive first projections of the units while the units are being inserted into each opening extends along one side of the row of openings and faces another stiffening member located on the other side of the row and having elastic tongues which are yieldable from a first to a second position by the second projections of the units during insertion. Upon insertion, the tongues reassume their first positions, thereby retaining the units. Passages are provided in the frame for insertion of a tool to deflect the corresponding tongues and demount the units.

7 Claims, 3 Drawing Figures

FRAME FOR THE MOUNTING OF INTERCHANGEABLE ELECTRICAL UNITS

CROSS-REFERENCE TO RELATED APPLICATION

This application is a continuation-in-part of my co-pending prior application, Ser. No. 210,663, filed on Dec. 22, 1971 now abandoned.

BACKGROUND OF THE INVENTION

The present invention relates to a support frame for mounting and demounting electrical units, and more particularly to a frame for interchangeable electrical units of the type which are wired to a source of electrical current at one side thereof and are provided with actuating means, such as switches, at an opposite side thereof.

Frames of known design exhibit safety hazards and require extra-operational steps for mounting and demounting the units. The prior art frames as well as the cover plates which are mounted over the frames for aesthetic purposes are constructed of metal. If during the mounting process, a wire carrying electrical current becomes disengaged from its terminal post and touches the metallic frame and/or the metallic cover plate, a serious electrocution hazard would result for a worker or a user.

Another disadvantage of the prior art metallic frames is that an extra-operational step, i.e. the bending of a metallic tab, is required for fixed mounting of the electrical unit. After the electrical unit has been inserted into a respective slot, a nearby tab is provided so that it can be bent to wedge the unit in place. A worker installing a unit must pause to pick up a tool for bending the tab, then bend the tab, and finally replace the tool. The high cost of electrical work and the cost of the special tooling makes these time consuming tasks very costly when it is considered that many thousands of electrical units must be mounted in complex electrical installations, such as in the wiring of a building.

Furthermore, the prior art metallic construction does not allow for easy removal of the electrical units. Demounting requires rebending the tab back into its original position. This is an even lengthier and costlier operation as compared with mounting in view of the fact that more exactness is required in achieving the original orientation of the tab and the increased probability that the tab will break off and thereby make the frame worthless.

Prior art metallic frames are also not made of one-piece construction. If stiffening members are to be provided, they are added on at a later assembly stage. In other words, additional work and tooling is required to provide for a sturdy structure.

SUMMARY OF THE INVENTION

Accordingly, it is the general object of the present invention to overcome the disadvantages of the prior art.

More particularly, it is an object of the present invention to provide a safe mounting frame for electrical units which is free from electrocution hazards.

Another object of the invention is to provide a frame which will firmly retain an electrical unit in place without requiring a bending operation by resorting to a tool.

A further object of the invention is to provide a simple and inexpensive frame for mounting electrical units.

An additional object is to provide a deformation-resistant frame.

An additional object is to provide a frame which can accept conventional electrical units without requiring modification of the latter.

In keeping with these objects and others which will become apparent hereinafter, the novel frame for mounting interchangeable electrical units having oppositely directed first and second projections is constructed of one-piece insulating synthetic plastic material. This construction feature overcomes the disadvantage of the metallic prior art frames by preventing electrocution hazards. The fear of electrocution by a worker will undoubtedly cause him to work at a very deliberate pace, thereby lengthening man-hours accordingly.

The one-piece construction feature overcomes the costly multi-piece construction of the prior art. Additional labor and materials are not needed to make and assemble wall-stiffening members to the frame. By molding the frame of synthetic plastic material at one time in a mold, mass production is now made feasible in an efficient manner.

The frame is further formed with at least one row of openings extending between a front and a rear surface of the frame. An electrical unit can be inserted into a respective opening in a direction from one of the two surfaces until it is arrested by an abutment provided in each of the openings. A stiffening member extending along one side of the row of openings has recesses to receive the first projections of the units which are being inserted into the adjoining opening. A second stiffening member extending along the other side of the row of openings has elastic tongues facing the recessses and which are deformable by the second projections of the units from a first to a second position during insertion of the units into the opening. Thereupon, the tongues reassume their first position so as to retain the units in their openings.

This "snap-in" locking feature overcomes the prior art disadvantage of requiring a metallic tab bending operation, as previously described. No man-hours are lost in handling special tooling; no metallic tabs will be snapped off.

The frame is further formed with passages extending between the front and rear surfaces and in line with each of the tongues so that a tool may be inserted therein to engage the respective tongue and to move the tongue from the first to the second position, and thereby permit removal of the electrical unit.

This snap-out feature overcomes the prior art disadvantage of unbending a ductile metallic tab as previously described. Time and expense are saved since no special exactness is required to snap the unit out of its position. Of course, no tabs will be subjected to breaking off either.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
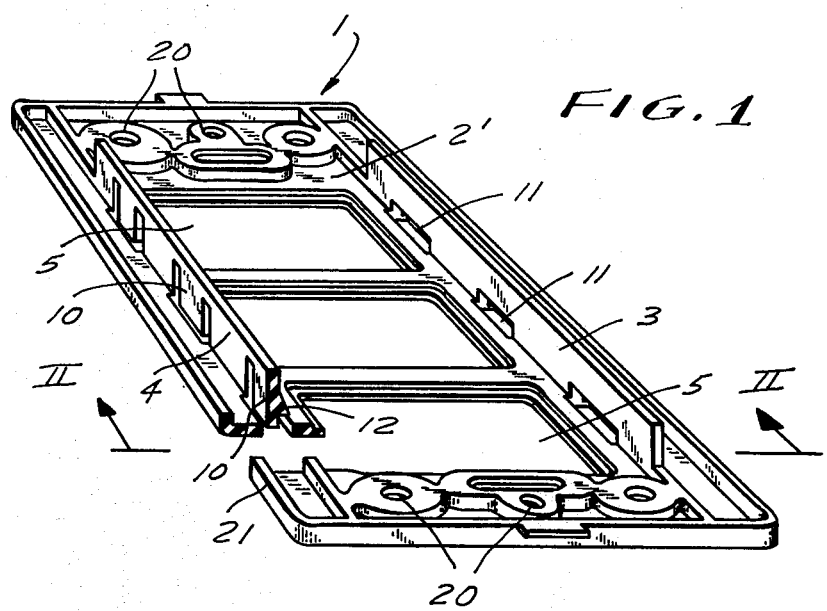
FIG. 1 is a perspective view, partly in cross-section, of a frame which embodies the present invention.
Figure 2:
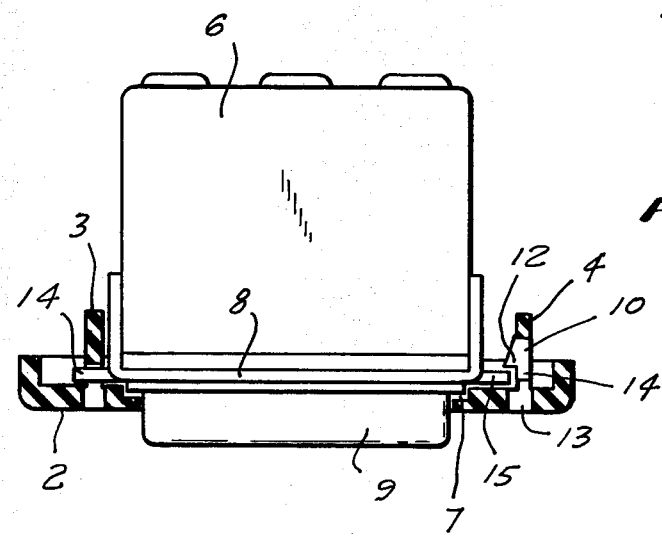
FIG. 2 is a sectional side view of the frame as seen in the direction of arrows from the line II—II of FIG. 1, with an electrical unit shown in fully inserted position.
Figure 3:
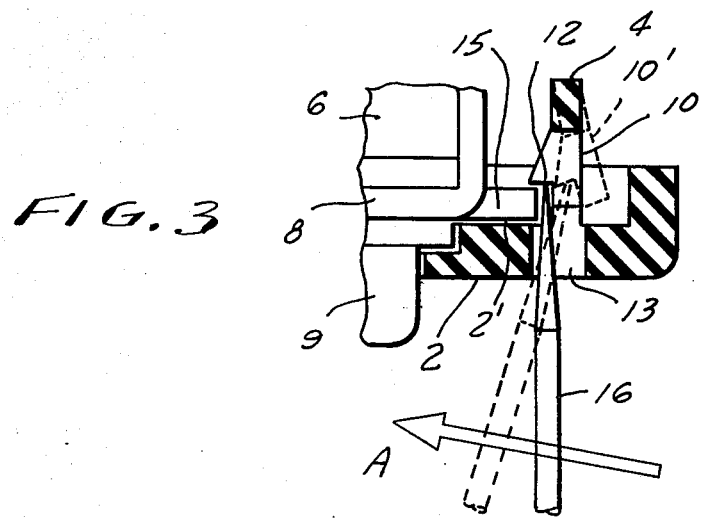
FIG. 3 is an enlarged view of a detail in FIG. 2, further showing the manner of demounting a unit.

Discussing the article of manufacture which has been illustrated in an exemplary embodiment in FIGS. 1–3, it will be seen that reference numeral 1 identifies the one-piece rectangular mounting frame consisting of insulating synthetic plastic material. The frame 1 is adapted to mount and demount interchangeable electrical units 6 of the type having a collar 8 and oppositely directed projections or lugs 14 and 15.

The frame 1 has a front surface 2 and a rear surface 2' and a row of rectangular openings 5 extending between these surfaces. An abutment in the form of a circumferentially complete shoulder 7 is provided in each of the openings so as to engage the collar 8 and thereby limit the extent to which the portion 9 of the unit 6 shown in FIG. 2 can be inserted into the opening 5 in a direction from the rear surface 2' toward the front surface 2.

A first stiffening member, here shown as an elongated rib 3, extends from the rear surface 2' along one side of the row of openings 5 and has recesses 11 each of which is adjacent to one of the openings 5. A second stiffening member or rib 4 similarly extends from the rear surface 2' and is located at the other side of the row of openings 5. The second rib 4 has elastic tongues 10 with notched end faces 12 facing the recesses 11.

Passages 13 are provided in the frame 1 between the front surface 2 and the rear surface 2' and each thereof is in line with a portion of one of the elastic tongues 10 so that a tool 16 may be inserted for demounting the electrical units 6.

In the mounting operation of an electrical unit 6, the projection 14 is initially inserted into a selected recess 11 while the electrical unit 6 is being inserted into the adjoining opening 5. The other projection 15 initially abuts the elastic tongue 10. As a force is exerted upon the electrical unit 6 in a direction from the rear surface 2' towards the front surface 2, the tongue 10 will be deflected from its original position by the projection 15 to a stressed position 10'. This deflection allows the projection 15 to move into a slot defined by the notched end 12 and the surface 2'. Thereupon when the tongue 10 reassumes or "snaps into" its original position, it will overlie the projection 15 so as to firmly retain the unit 6.

The shoulder 7 engages the collar 8 so as to limit the extent to which the front portion 9 of the unit 6 may extend through the opening 5. FIG. 2 shows a unit 6 snapped into place.

In the demounting operation, as shown in FIG. 3 of the drawing, the tool 16 may be initially inserted through a passage 13 so as to abut the tongue 10 in the region of the notched end face 12. Thereupon, a force applied in the direction of the arrow A will cause the tongue 10 to be deflected into the stressed position 10' and the tongue 10 will no longer overlie the projection 15. The movement permits the unit 6 to be removed by a "snapping out" action.

The frame 1 is formed of insulating synthetic plastic material preferably self-estinguishing, such as a policarbonate, so that electrocution hazards are minimized to the workman as well as to a user. The one-piece construction makes additional wall stiffening members unnecessary, thus resulting in efficient fabrication.

The frame is so constructed that it is able to mount readily available interchangeable electrical units without requiring any modification of the latter. Since no new equipment, or tooling, or production procedures are needed, it is apparent that the utility of the frame is enhanced because of its ready adaptability to commercially available units.

The frame may have additional openings 20 for mounting the frame on a junction box. For example, four openings 20 are equidistantly located in the region of the four corners of the frame for mounting purposes. The reference character 21 denotes a reinforcing flange which surrounds and extends rearwardly beyond the surface 2'.

If the frame comprises two parallel rows of openings, the rib between the two rows of openings has two rows of recesses 11, one row in each of its sides, and each of the other two ribs has a row of tongues 10. However, it is also possible to provide two ribs for each row of openings; each of the two ribs between the two rows of openings is then formed with a single row of recesses.

The width of each recess may equal the width of a tongue, as considered in the longitudinal direction of the respective ribs. This renders it possible to insert each unit 6 in two different positions, i.e., in a position as shown in FIG. 2 and in a second position in which the tongue 10 overlies the projection 14 whereas the projection 15 extends into the recess 11.

It will be understood that each of the elements described above, or two or more together, may also find a useful application in other types of constructions differing from the type described above.

While the invention has been illustrated and described as embodied as a frame for the mounting of interchangeable electrical units, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that from the standpoint of the prior art fairly constitute essential characteristics of the generic or specific aspects of this invention; and therefore, such adaptations should and are intended to be comprehended within the meaning and range of equivalence of the following claims.

What is claimed as new and desired to be protected by Letters Patent is set forth in the appended claims:

1. As a novel article of manufacture for mounting interchangeable electrical units having oppositely directed first and second projections, a one-piece mounting frame consisting of electrically insulating synthetic plastic material and having a front surface, a rear surface, a row of openings extending between said surfaces, an abutment provided in each of said openings to limit the extent to which an electrical unit can be inserted into the respective opening in a direction from one toward the other of said surfaces, a first elongated frame-stiffening member projecting upwardly from and extending longitudinally of a substantial portion of said one surface along one side of said row of openings and having recesses which are located adjacent to the openings of said row and adapted to receive the first projections of electrical units which are being insertted into the adjoining openings, a second elongated frame-stiffening member projecting upwardly from and extending longitudinally of a substantial portion of said one surface along the other side of said row of openings and having elastic tongues which face said recesses and are deformable by the second projections of electrical units from first to second positions during insertion of such units into the adjacent openings while the first projections of the units extend into the corresponding recesses of said first member, to subsequently reassume said first positions and to thereby overlie the respective second projections so as to retain the units in their openings, and passages extending between said front and rear surfaces and each in line with a portion of one of said tongues in the first position of the respective tongue so that a tool which is inserted into a passage in a direction from said other toward said one surface can engage and move the corresponding tongue from the first to the second position thereof and to thus permit removal of an electrical unit from its opening.

2. An article as defined in claim 1, wherein each of said tongues has a notched end face located opposite the respective passage.

3. An article as defined in claim 1, wherein said one surface is said rear surface and each of said abutments is a circumferentially complete shoulder in the respective opening.

4. An article as defined in claim 1, wherein each of said stiffening members is an elongated rib.

5. An article as defined in claim 1, wherein said tongues have end faces spaced apart from said one surface of said mounting frame to provide room for second projections of electrical units in said first positions of said tongues.

6. An article as defined in claim 1, wherein said frame further comprises a reinforcing flange disposed around and extending beyond said rear surface.

7. An article as defined in claim 1, wherein each of said stiffening members is an elongated rib and said ribs are parallel to each other, the width of said tongues being substantially equal to the width of said recesses, as considered in the longitudinal direction of the respective ribs.

* * * * *